(12) United States Patent
Crivello et al.

(10) Patent No.: US 9,087,454 B2
(45) Date of Patent: Jul. 21, 2015

(54) INTERACTIVE TRAINING METHOD AND SYSTEM FOR DEVELOPING PEAK USER PERFORMANCE

(75) Inventors: Frank Crivello, New York, NY (US);
William Metzger, New York, NY (US);
Frank Codella, Grand Island, NY (US);
Royce Pinkwater, New York, NY (US)

(73) Assignee: At Peak Resources, LLC, New York, NY (US)

( * ) Notice: Subject to any disclaimer, the term of this patent is extended or adjusted under 35 U.S.C. 154(b) by 189 days.

(21) Appl. No.: 13/306,471

(22) Filed: Nov. 29, 2011

(65) Prior Publication Data
US 2013/0138734 A1     May 30, 2013

(51) Int. Cl.
*G06F 15/16* (2006.01)
*G09B 19/00* (2006.01)
*A63B 24/00* (2006.01)

(52) U.S. Cl.
CPC .......... *G09B 19/003* (2013.01); *A63B 24/0003* (2013.01)

(58) Field of Classification Search
CPC ................................ A63B 22/00; A63B 24/00
USPC ................ 709/202–208; 340/573.1; 382/107; 602/27; 600/520, 300; 701/206; 715/709; 434/247; 707/769; 482/8
See application file for complete search history.

(56) References Cited

U.S. PATENT DOCUMENTS

| | | | | |
|---|---|---|---|---|
| 7,874,997 | B2 * | 1/2011 | Jaccard | 602/27 |
| 8,593,286 | B2 * | 11/2013 | Razoumov et al. | 340/573.1 |
| 2005/0113650 | A1 * | 5/2005 | Pacione et al. | 600/300 |
| 2006/0189852 | A1 * | 8/2006 | Greenwald et al. | 600/300 |
| 2006/0204045 | A1 * | 9/2006 | Antonucci | 382/107 |
| 2007/0021269 | A1 * | 1/2007 | Shum | 482/8 |
| 2007/0225118 | A1 * | 9/2007 | Giorno | 482/1 |
| 2009/0144639 | A1 * | 6/2009 | Nims et al. | 715/757 |
| 2010/0017371 | A1 * | 1/2010 | Whalin et al. | 707/3 |
| 2010/0088023 | A1 * | 4/2010 | Werner | 701/206 |
| 2010/0292600 | A1 * | 11/2010 | DiBenedetto et al. | 600/520 |
| 2011/0098928 | A1 * | 4/2011 | Hoffman et al. | 702/5 |
| 2011/0145114 | A1 * | 6/2011 | Purdy et al. | 705/34 |
| 2011/0179068 | A1 * | 7/2011 | O'Brien | 707/769 |
| 2012/0023163 | A1 * | 1/2012 | Mangold | 709/203 |
| 2012/0144301 | A1 * | 6/2012 | Bass | 715/709 |
| 2012/0251990 | A1 * | 10/2012 | Urbanowski et al. | 434/247 |
| 2012/0315986 | A1 * | 12/2012 | Walling | 463/31 |

* cited by examiner

*Primary Examiner* — Dustin Nguyen
(74) *Attorney, Agent, or Firm* — Bechen PLLC (57) ABSTRACT

The present invention provides a computerized interactive training method and system for receiving a user data including physical user data, medical history data and athletic goal data for the user. The method and system further includes determining a baseline data set for the user and generating a training routine for the user based on the baseline data set and the user data, including selecting a plurality of exercises for the user directed towards the athletic goal data. The method and system further includes determining a network of related users electronically networked via a networking interface, transmitting the training routine to the user and notifying the related users of the training routine. The method and system provides for receiving training feedback data from the user, including exercise-specific information and sharing the training feedback data with fellow community users.

16 Claims, 4 Drawing Sheets

INTERACTIVE TRAINING METHOD AND SYSTEM FOR DEVELOPING PEAK USER PERFORMANCE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to computer-aided physical training systems and more specifically to integrating training systems with social gaming and networking functionality and generating algorithm based dynamic training routines based on medical data

BACKGROUND OF THE INVENTION

There currently exist many techniques for training users for development and performance of physical activities. It is well known that an athlete will begin a training routine that includes various exercises and then follow that routine to improve his or her physical abilities.

A user typically selects a training goal or a purpose for a workout routine and then tailors the training to that purpose. For example, a user may set a goal of losing weight, so the user may select physical activities that improve muscle mass for a higher resting metabolic rate, exercises for general cardio improvement and high intensity interval workouts for maximum caloric burn. In another example, a user may begin training for a particular sport, such as to be a running back on a football team. The training may include weightlifting to increase strength agility training exercises to improve lateral movements, and strengthening knees, ankles and other joints.

Common training techniques fall into one of two categories. A first category is a one size fits all training routine, where athletes are given a general routine for a general purpose. An example may be someone undertaking a 90-day video workout routine, where the training routine is generally same for everybody.

A second example is a user-customized routine, such as hiring a personal trainer. The trainer may take an amalgamation of exercises and select different ones for the user to perform. The selection of the personalized training routine is typically based on the physical characteristics and goals of the user There is also a growing trend for integrating electronic and computing devices into training techniques. Electronic training logs have been available and widely usable for athletes, including training logs available through private web locations. There are also further refinements of online and electronic tracking techniques and platforms based on the growth of mobile computing, smart phone technology and visual graphic gaming systems. For example, there are numerous smart phone applications available to the public that facilitate training activities. Some applications include generating suggested workout routines based on user preferences and training log data entry systems. Other applications utilize internal components of smart phone, such as GPS to track movement during a workout. Similarly, there are functionalities available through gaming systems and visual measurement devices, such as for example the Wii® Fit system or the Kinetic® system for Microsoft XBOX® gaming system.

As noted above, there are many available options for an athlete to generate a training routine and track the performance of that routine. The existing techniques are limited in ways that can have detrimental effects for the athletes. For example, in the area of youth sports, there is an alarming trend in the growth of serious sports injuries. The standard training techniques used for many years have contributed to these injuries because there is a lack of examination of these exercise routines from an injury perspective. Current training techniques fail to account for medical science information, biomechanical analysis, sport specific injury rates and baseline information for the individual athlete.

Similarly, while there is a growth in social gaming and networking, there is also a failure for combining training with the automated functionality of the social gaming and networking platforms. For example, athletes typically train as part of a team and it is reasonable for competitions to occur between teammates. None of the strength and conditioning programs incorporate social gaming and networking platforms providing for integration of training tracking information and social interaction/competition. Similarly, none of the strength and conditioning programs incorporate social networking platforms to provide for further enhancement or usage of the tracked data and competition data, including sponsorship or game-based competitions for promoting user-specific training.

As such, there exists a need for a system and method, including a computing platform that provides for the generation of user-specific training routines, that are modified as the user progresses the training program, as well integrating the training and achievements of training into an interactive social gaming and networking platform for improving athlete training and team camaraderie, as well as resulting in lower injury rates and better health and performance.

SUMMARY OF THE INVENTION

The present invention provides a computerized interactive training method and system including processing operations for receiving a plurality of user data for a user, the user data including physical user data, medical history data and athletic goal data for the user. The method and system further includes determining a baseline data set for the user based on the user data and generating a training routine for the user based on the baseline data set and the user data, including selecting, from a data set of exercises, a plurality of exercises for the user, the exercises directed towards the athletic goal data. The method and system further includes processing steps of determining a network of related users electronically networked via a networking interface, where the relations are based the athletic goal and transmitting the training routine to the user and notifying the related users via the networking interface. Thereupon, the method and system provides for receiving training feedback data from the user, including exercise-specific information and sharing the training feedback data with fellow community users across the networking interface.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

In the following description, reference is made to the accompanying drawings that form a part hereof, and in which is shown by way of illustration specific embodiments in which the invention may be implemented. It is to be understood that other embodiments may be utilized and design changes may be made without departing from the scope of the present invention.

Many sports related injuries can be avoided and prevented if athletes, including student athletes, participate in sports specific and age appropriate strength and conditioning exercises and appropriate times, e.g. before, during and after a particular sports season. Therefore, the computing platform and corresponding system and method is a social conditioning platform that encourages greater utilization of the training platform based on the psychology of team working and social networking computing functionalities.

Figure 1:
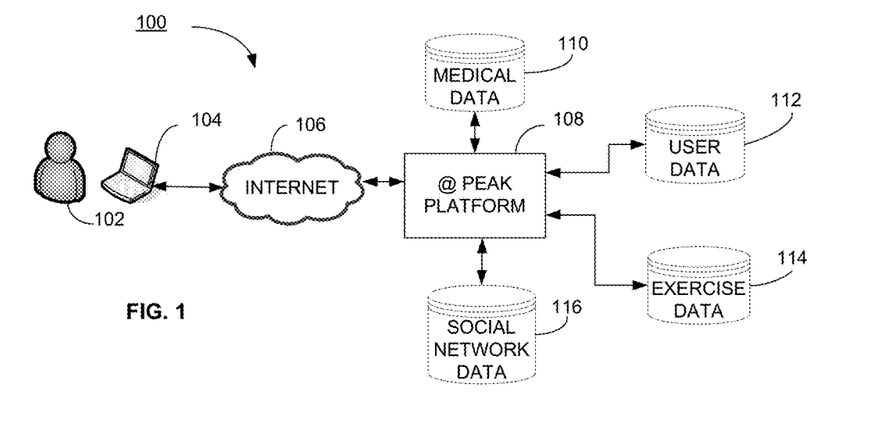
FIG. 1 illustrates a block diagram of one embodiment of a computerized interactive training system and computing platform.

FIG. 1 illustrates a block diagram of one embodiment of a system 100 for the computerized interactive training. This system includes a user 102, a computing device 104 and a network connection 106 (typically the Internet). The system 100 further includes a computing platform 108, medical data database 110, user data database 112, exercise data database 114 and a social network data database 116.

The user 102 may be any suitable user, such as an athlete, a student athlete, an individual seeking to train for one or more events and more generally, any person seeking to establish a training or workout routine. The embodiments described herein refer to a student athlete, but it is recognized that the method and system is equally applicable to any type of user.

The computing device 104 may be any suitable device including but not limited to a laptop or desktop computer, tablet computer, a smart phone, a gaming system or console, or any other suitable device operative for interacting with the user 102 and communicating across the network 106. The platform 108 may be one or more processing devices operative to perform processing operations, as described in further detail below. The platform may be a stand-alone processing component, or may be in a distributed computing environment, as recognized by one skilled in the art.

That databases 110, 112, 114 and 116 may be one or more data storage devices operative to store corresponding data therein. The databases may be local and/or distributed storage devices, as well as may be integrated within a larger data storage system. The illustration of 4 separate storage devices 110, 112, 114 and 116 does not expressly limit or require 4 distinct data storage units, but are illustrated separately for clarity purposes only.

The databases are characterized by the data stored therein. The medical data in the medical data database 110 includes, but is not limited to, sports related injury information and other data usable and/or associated with the physical activity. For example, the medical data may include statistics for indicating at risk individuals based on medical data and research or other data on recommended activities to mitigate risks. In another example, the medical data may include research indicating a correlation between a particular athlete, a training technique/regiment and a likelihood of sports injury. In general terms, the medical data may be any data that relates to medical information and/or sports injury information.

The user data in the database 112 may be any data relating to the user 102. This data may include, but is not limited to, background information on the user, family history data, personal medical information, demographic information, sports training and goals information, physical ability data (including baseline data as described in further detail below), ongoing training and progression activity and any other suitable type of data.

The exercise data in the database 114 includes data relating to exercises, including different types of exercises, modified versions of exercises, and data associated with each exercise, such as for example the targeted muscles, the stress points for affected muscles and joints, warning information for various exercises, recommended weight/volume information for an exercise, recommended related or complimentary exercises, instructional information including description data and/or video data illustrating proper form, or any other suitable type of data.

The social network data in the database 116 may be any suitable data relating to a social network within the platform, as well as game and game mechanic data. The social network data may include, but is not limited to, social connection data including which teams or groups the user is associated with, which teams or group the user's team is in competition with, third party information such as commercial associations and/or endorsements, social goal and/or benchmark information such as dates of important milestones or competitions (e.g. two teams playing each other), and any other suitable information relating to the social aspect of the platform. The game and game mechanics data may include, but is not limited to, rules and feedback data processing for enhancing gameplay and user interactivity operations. The game and game mechanics data include processing algorithms and performance guidelines for application to and combination with non-game context, as described in further detail below.

Figure 2:
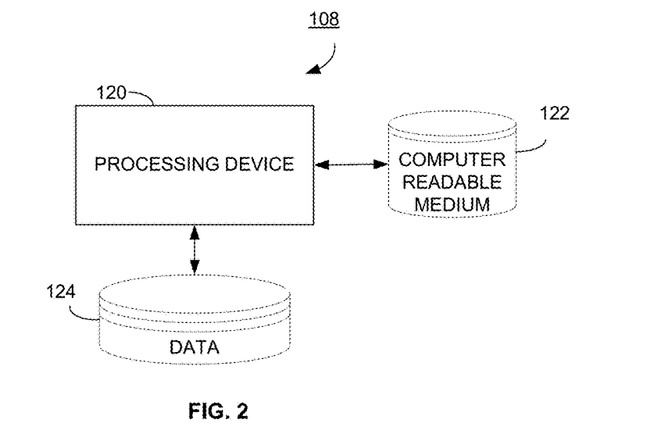
FIG. 2 illustrates a block diagram of one embodiment of the computing platform providing for the interactive training system and method.

For sake of brevity, various embodiments of the operations of the platform 108 will be described with reference to the figures below. FIG. 2 illustrates a block diagram of one embodiment of the computing environment of the computing platform 108 for generating peak performance for the user. The platform, from a generalized description, includes a processing device 120, a computer readable medium 122 having executable instructions therein and a database 124.

The processing device 120 may be one or more local and/or distributed computing processing devices operative to electronically perform processing operations. The computer readable medium 122 stores executable instructions whereupon the processing device 120 is operative to perform the processing operations in response to the executable instructions. Moreover, the processing device 120 is operative to perform the processing operations on the data from the database 124, wherein the data may include data such as medical data, user data, exercise data and social network data as described above.

Figure 3:
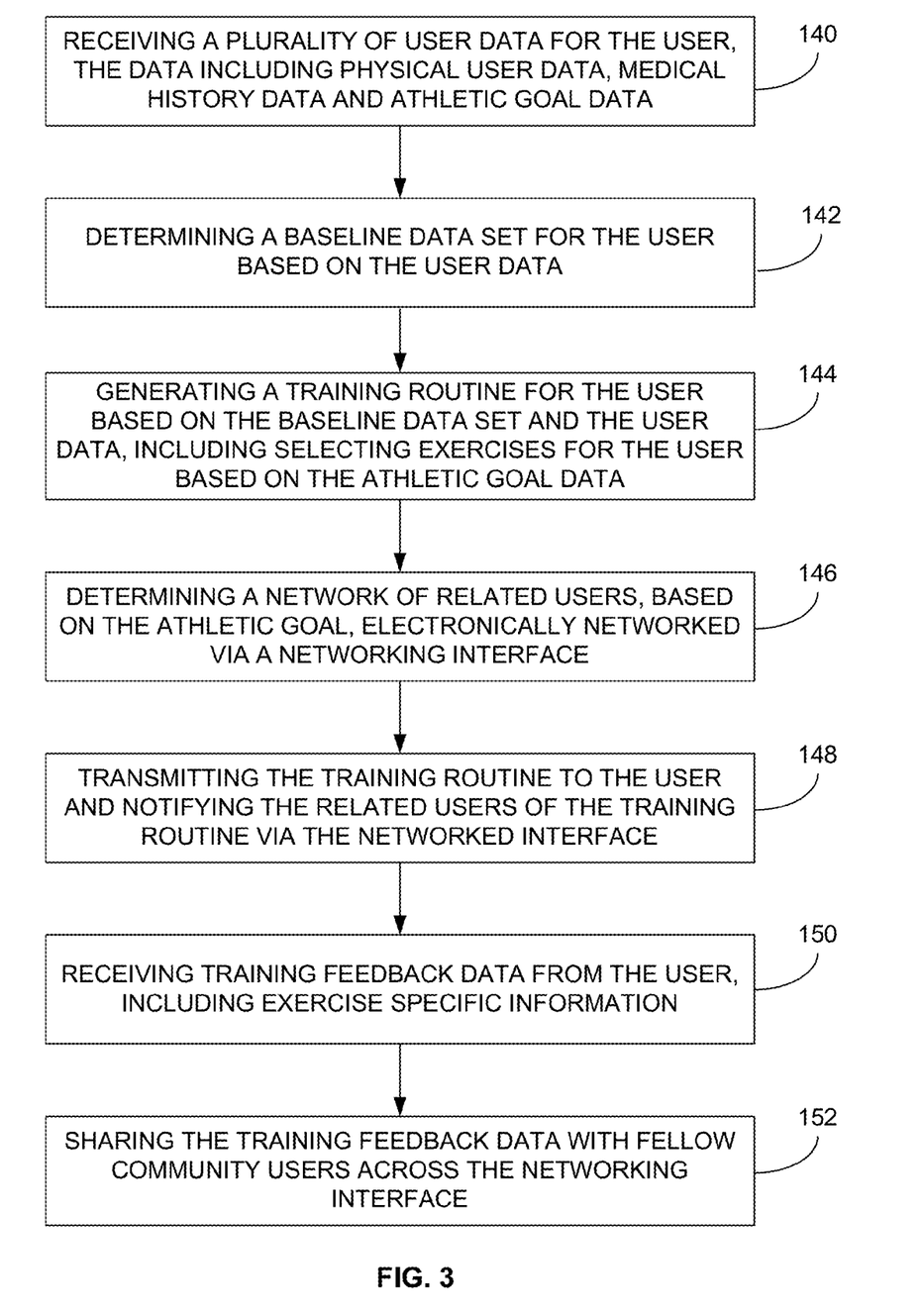
FIG. 3 illustrates a flowchart of the steps of one embodiment of a method for computerized interactive training.

FIG. 3 illustrates a flowchart of the steps of one embodiment of a computerized interactive training method. With reference to FIG. 1, the operations of this embodiment may be performed by the platform 108, including interaction with the user 102 via the network connection 106, with communication and processing of data from databases 110, 112, 114 and 116.

A first step, step 140, is receiving a plurality of user data for the user, the data including physical user data, medical history data and athletic goal data. This step may be performed based on the user 102 entering information into the computing device 104, such as filling out one or more electronic forms. Additionally, the data may be acquired from external sources, such as accessing other databases of information, for example accessing electronic medical records, such as information from the user's last physical examination by a medical doctor and family history information. The data may also be acquired from other sources, such as information entered by coach, trainer or group supervisor, where that information may include the athletic goal data such as benchmarks for a particular sporting season, e.g. pre-season, important games, post-season, etc. It is noted, the above examples of data are illustrative in nature only and are not meant to be expressly limiting.

In the method for interactive training, a next step is determining baseline data set for the user based on the user data, step 142. This baseline data set may include the user performing a set of baseline exercises to determine the user's baseline statistics. By way of example, these may include: timing the running of a defined distance; performance of a number of calisthenics; determining physical characters such as a resting heart rate, blood pressure, weight, BMI, etc.

The determining of the baseline data in step 142 may be performed, in one embodiment, by the platform 108 extracting this information from the data received in step 140, as well as accessing the information from any of the applicable databases 110, 112, 114 and/or 116. In another embodiment, the baseline data may be acquired by the entering of this data into the platform 108 by the user 102 or another user, e.g. coach, trainer, etc.

With reference to the method of FIG. 3, a next step is the generating a training routine for the user based on the baseline data set and the user data, including selecting a plurality of exercises for the user based on the athletic goal data, step 144. This step may be performed by the processing device 120 of the platform 108, as noted in FIGS. 1 and 2.

Unlike prior art systems, the generation of the training routine of the platform 108 takes into account the user data that includes medical history data and the athletic goal data and generation of modified training routines based on an individual's interaction with the platform, and based on analytics showing the success or lack of success of various social gaming and networking dynamics. Prior techniques fail to account for the medical history data, including injury-prone exercises and activities relative to the user performing the exercise and the athletic goals of the user. Every year, it is estimated that ten to twenty percent of the thirty million children and teens who participate in organized sports are injured and one in four of those injuries is considered serious. Many of those injuries, including the serious injuries, can be avoided and/or mitigated based on taking into account the medical history and medical information in generating the training plan, as performed by the platform 108.

The medical data provides information regarding the most common injuries by age, sex and associated sport or activity. The medical data additionally includes which strength and conditioning exercises address, and can help mitigate, these potential injuries. Medical information, as well as gaming mechanics, described in further detail below, also provide for incentivizing and rewards as part of a feedback loop, for example medical data relating to activities can include physical and conditioning improvement markers or graduated exercises for increasing strength/conditioning integrated into a competition or reward system with other users, e.g. teammates or competitors.

The generated training plan is thus age and sport specific for the user, helping to minimize injuries. The generating of the training plan includes determining which exercises or types of exercises are appropriate based on accessing the exercise data database 114. The exercise data may include information usable for the processing operations to filter and select the appropriate exercises to generate the routine. Processing algorithms within the platform can assemble the exercises into a training routine, including exercises and activities for different days over any number of time intervals. As described in further detail below, the platform is also operative to update and modify the training routine on an on-going basis based on feedback of user data.

With reference back to FIG. 3, another step of the method is the determination of a network of related users, based on the athletic goal, the users being electronically networked via a networking interface, step 146. As noted in FIG. 1, the platform 108 accesses social network data from the database 116. The social network interface may be any suitable type of interface as recognized by one skilled in the art for allowing the association of various users into defined groups or teams. The interface further allows for noting rivalries or competitions with other groups, as well as the display of individual user and group information on the interface. Therefore, the interface may include a user's account with user information and an avatar, such as a well-known athlete, sports figure, logo, or other image. The interface may display the user's statistics, team affiliation, fellow team members, competitors, rival teams or any other social information relating to the sporting activities. As described in further detail below, the social interface may additionally include further functionality allowing for third party interaction, such as sponsorship, or the inclusion of games or other competition dynamics between teammates and rivals.

In this embodiment of the method for interactive training, a next step is transmitting the training routine to the user and notifying the related users of the training routine via the networked interface, step 148. Transmission of the training plan may include posting the plan to the social network interface or could involve actual electronic delivery to the user or a coach, trainer, parent or other individual. By way of example, the user may opt to receive a daily text message or email message that includes the days training plans. In another example, the user and the coach may receive a daily or weekly spreadsheet or list of exercises for the day or week. Additionally, this training information is made available for viewing by connected members on the social interface, such as being visible by a teammate. It is also recognized that the display of training data may also be blocked to certain users, such as preventing a competitor from knowing the user's particular training regiment. Notifying the related users may include, but not limited to, the display of the information on the social network or providing actual notification via an electronic communication.

Step 150 of the method is receiving training feedback data from the user, including exercise specific information. In this step, relative to FIG. 1, the user 102 enters training information into the computing device 104, or by other means as described in further detail below in FIG. 4. The information is then provided to the platform 108, whereupon it is processed by the processing device 120 of FIG. 2 and stored in the user data database 112. The receipt of training data from the user may also be via a coach, assistant coach, trainer, parent or other person supervising or assisting with the athletic development.

The training data may include generalized confirmation of the performance of a particular exercise or work-out, or may be further explicit information including exercise data points. For example, the user may log the completion of a 2 mile run, or may log the run as being completed in a time of 12:32 with a first mile at 6:02 and a second mile at 6:30, as well as a rating scale of exertion level indicating the run as a 4 on a scale of 1 to 10. The user may log the equipment used to determine when it is time to service or replace equipment, e.g. running shoes, bike tires, etc. In another example, the exercise data may include weight lifting sets and routine information including pounds lifted, number of reps and number of sets. The training data may also include heart rate information or other medically related data, as available.

In the method of FIG. 3, step 152 provides for the sharing the training feedback data with the fellow community of users across the networking interface. Thus, in this step, the training feedback data is then provided for display to the socially connected users, including fellow teammates for example. The display of information may be the full training data, or for brevity may be truncated or generalized data, such posting the user completed a workout, posting the generalities of the workout and omitting the fine-level details. Regardless of the volume of data displayed, general feedback and training information is thus made available to other users in the training community, including allowing other users to comment or inspire each other by leaving messages on the platform.

In the embodiment of FIG. 3, the processing system of FIG. 1 provides the interactive training method via a computing platform. The user receives a personalized workout routine based on baseline data and accounting for medical data. The tracking of the performance of the activities are viewable via the platform and fellow users, e.g. teammates, can then monitor and track each other's training activities.

Figure 4:
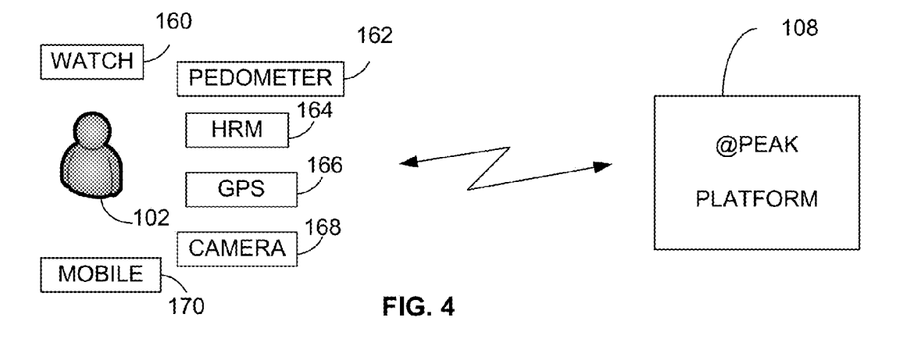
FIG. 4 illustrates a block diagram of one embodiment of the user data collection and interaction techniques for the computerized interactive training platform.

FIG. 4 illustrates a graphical representation of alternative embodiments providing for the collection and/or sharing of training feedback data. The user 102 has access to any number of training accessories, including a watch 160, pedometer 162, heart rate monitor 164, global positioning system (GPS) device 166, camera 168 and a mobile communication device 170. It is recognized that many accessories can include multiple components, such as a wristwatch including a GPS and a heart rate monitor, as well as a wireless communication transmitter for communicating with a computing base station.

In the example of a camera 168, this may be embedded in the mobile device 170, such as a smart phone or the camera 168 may be connected to computing base station. For example, the user may have a laptop computer with a webcam connected thereto, such that the camera may track the user's training activities. Another example may be an interactive video gaming system that includes a camera or other type of motion sensor/detector device. The camera can track user activities, as well as note form for the performance of the exercise(s).

In one embodiment, as noted above, the exercise data may include graphical representations of the performance of activities, such as a video or graphical animation of a user performing the exercise. The camera may record the user's performance of the exercise and then provide a visual overlay or other type of comparison with the visual data in the exercise data.

As illustrated in FIG. 4, the exercise feedback data collected by the devices 160-170 is therein provided to the At Peak platform 108. This data may be in communication consistent with communication techniques described above, including data entry or data download and transmission across the networked connection. It is also noted, the elements listed in FIG. 4 are representative examples and not limiting in nature, it is understood that any other suitable data measurement device may be utilized and available for collecting training data, including for example treadmill or stationary bike computers, swim lap counting devices, bicycle odometers and/or power meters, etc.

Figure 5:
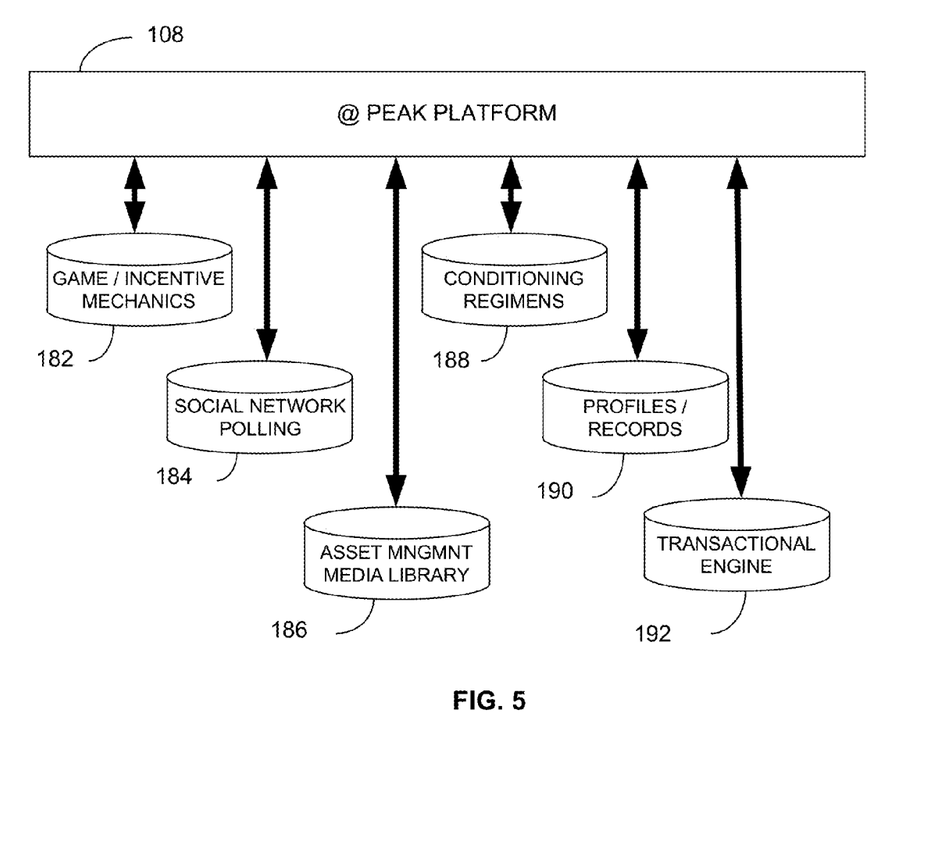
FIG. 5 illustrates one embodiment of the back-end data processing and platform for computerized interactive training.

FIG. 5 illustrates a graphical representation of the varying operational components providing computational functionality to the At Peak Platform 108. The platform 108 includes embedded dynamic learning algorithms for providing operations as described above. Moreover, the platform interacts with various components, including data storage and processing engines. FIG. 5 illustrates the game/incentive mechanics engine 182, the social network polling engine 144, the asset management and media library 186, the conditioning regimens 188, profiles and records database 190 and a transactional engine 192.

The game and incentive mechanics engine is operative to provide gaming or incentive based functionality to the platform. For example, one embodiment includes third party sponsorship or contest information for the users. The engine 182 may provide incentives to the users by having a promotion or other type of activity integrating a third party to provide a price or reward. Virtual rewards are one example of a type of reward, e.g. free ability to customize the social interface, application such as using a workout avatar of a team logo. In another example, a physical reward can include a prize from a sports equipment vendor to a team that has the highest percentage of completed workouts, or which logs the most running miles, or any other type of training metric. The contest and interactivity is also not restricted to a third party environment, but rather the engine 182 can readily provide competitions or incentives for points or bragging rights to the different users and/or teams on the platform.

In addition to incentive features, the engine 182 is also operative to perform algorithmic processing for training feedback and program modifications. The engine 182 may include rules and feedback loop processing operations to monitor training and/or gameplay activities and modify the game mechanics appropriately. For example, one aspect to monitor how quickly users or teams advance to goals, possibly increasing or decreasing the goals and rewards to better track development. For example, if the training goal can be unsafe to attain, meaning that users will have to risk injury to acquire a goal, the engine can determine the safety of achieving that goal, e.g. the average miles run per week would be at an unsafe level, and then modify the goal to an appropriate level. Similarly, the engine 182 monitors the game play and utilizes neuro-scientific principles, quantified as defined rules for governing the engine algorithms, to provide consistent challenges, incentives, reward attainments and the rush and/or excitement to maintain the excitement and enjoyment in training activities.

The social network polling engine 184 may provide varying degrees of feedback and interfacing functionality. For example, polls may be conducted relative to the exercise, relative to a competition, relative to a third party, or any other type of exercise or sports related poll. The engine 184 is operative to provide the corresponding functionality for interfacing with the platform and make the polls available, as well as functionality for using or processing the poll result information.

The asset management and media library 186 provides management of data, including managing ownership of medical data in the event of any regulations relating thereto. Similarly, the library 186 provides for the management of media files, such as the exercise data and images of sports heroes or athletes. As noted above, it may be preferable for a user to select a revered sports hero or athlete for an avatar for their account. This library provides for managing the images as appropriate. Similarly, access to media may be made available based on incentive programs, e.g. if you complete X number of workouts, you get access to a larger library of media files, so this restricted access can be managed by the library 186.

The conditioning/regimens engine 188 provides data for the exercise programs. Based on athletic goals, the user (athlete) undertaking the training plan with the various exercises directed towards the athletic goal, accounting for medical and injury-related information. It is also noted that the conditioning and regimens are not static in nature, but are modified as the user progresses the training program. Therefore the engine 188 allows for the modification of the training program, as needed.

The profile and records database 190 stores the user data as appropriate. This database 190 may include not only the original profile data, the baseline data, but also the feedback data as the user progresses through the training regiment. Additionally, the database 190 may store interaction data from the social networking platform, including user affiliations, postings and communications across the platform, and other suitable information.

The transaction engine 192 includes any number of executable instructions for the performance of transactions by the platform 108. The herein described functionality is readily performed based on executable instructions such that modification of the functionality of the platform is updated.

Figure 6:
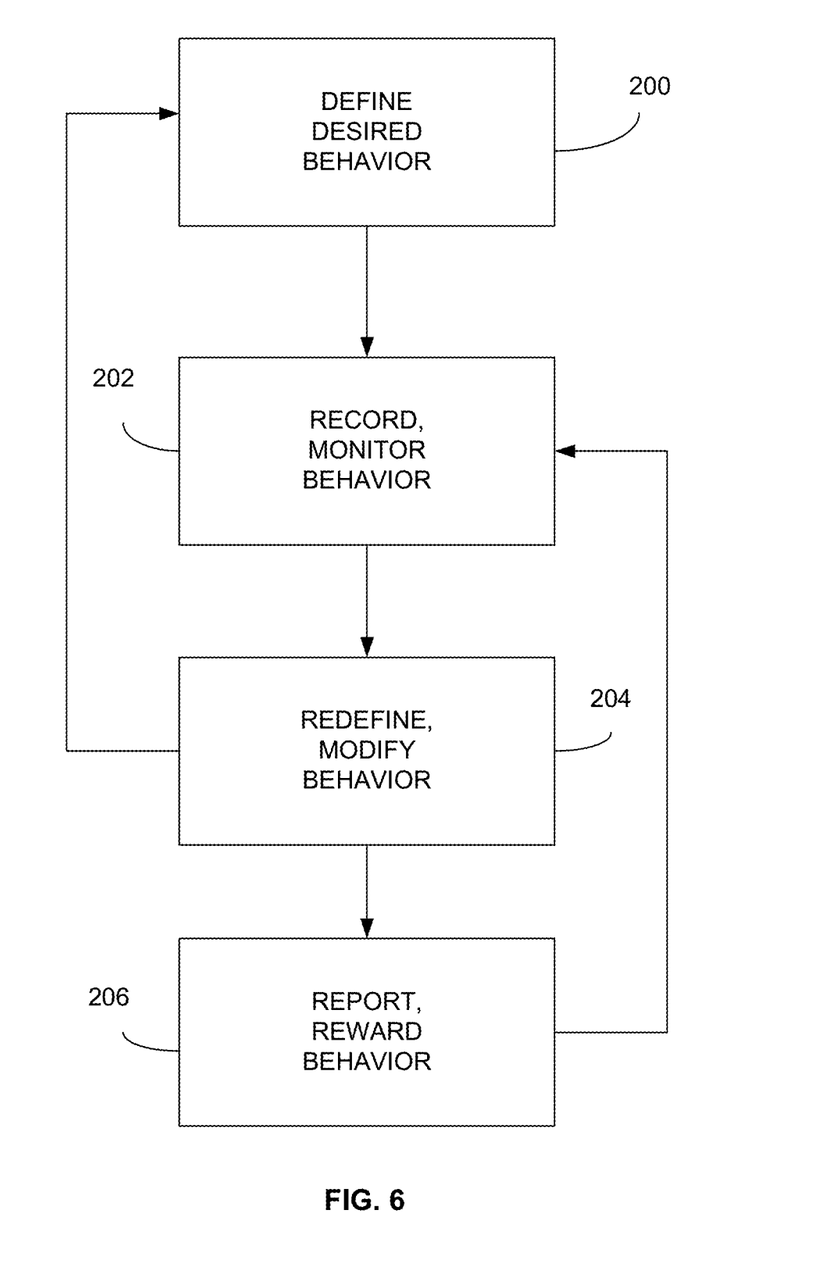
FIG. 6 illustrates a generalized flowchart of the interactive training platform.

FIG. 6 illustrates a generalized behavior modification flow chart of the operation of one or more embodiments of the peak platform described herein. A first step, step 200, is defining desired behavior. This may include registering each user, including entering the user's school, age, date of birth, sex, sport and/or team, height, weight, resting heart rate, body fat percentage, sports calendar, or other information. It is recognized that further levels of security and compliance may be required based on regulations, such as parental approval under Children's Online Privacy Protection Act (COPPA) or other guidelines. The user may also wish to select an avatar to represent his or her online account.

The first step 200 further includes the establishment of a baseline workout, including performing a series of exercises and entering heart rate information as an input. From this, the system can generate a personalized exercise routine that takes into account medical and sport-injury information.

As part of the desired behavior of step 200, the user may also receive personalized strength and conditioning workouts, including viewing video and medical animations of each exercise. The user can review descriptions for what each exercise does and what injury it helps to avoid. The user can also use a camera or other device for motion capture, usable for a side-by-side or other type of video overlay with the original video or animation for perfecting the user's form. Additionally, the user can review personalized workout regimens including the number of times per week for training, number of reps per exercise, amount of time needed, goal/milestones and potential rewards for the user. In one embodiment, the platform may synchronize or otherwise distribute and provide the training information for integration with the user's calendar, including populating the calendar with the training information.

A next step, step 202, is to record, monitor behavior. This step includes providing training information to the user and/or a coach or trainer. For example, the user might get a text or voicemail indicating it is time to begin the workout. The user can then record the time of day, number of reps, start/stop time for each exercise and overall time. After completion the user submits this information, and any other relevant information, to the platform. As part of the monitoring of behavior, the user can get immediate feedback including viewing reward status and progress towards goals, as well as receiving an automated text or communication from a coach or trainer acknowledge the workout. Similarly, as the platform is a social platform, relating and socially connected users can see the workout information, comment, and the user can also check in on fellow teammates.

A next step, step 204, is to redefine and modify behavior. As noted above, the platform provides for continuous feedback and adjustment of the training routine. Therefore it is important to monitor and modify the workouts as necessary. The modification can be to increase or decrease activities, as well as adjust or change milestones, goals, and/or potential rewards.

As noted in FIG. 6, step 204 progresses by either reversion back to step 200, including the personalized exercise regimen or continuing to step 206. In step 200, when the training program is modified for the user, the user is then provided with updated training information. This includes video segments of new exercise, when available, as well as the associated descriptions and video overlay functionality to perfect form. Additionally, the user's calendar may again be updated to integrate the modified training.

In progression to step 206, the interactive training system provides for reporting, rewarding behavior. The platform includes aggregating team reporting information for coaches and teammates on a regular interval, e.g. weekly, monthly. Similarly, under the social networking, the coaches and team members can comment to the team or individuals, those comments visible on the platform.

As part of the interactive system, one embodiment provides for rewards and/or incentives. Users and teams can get points or badges for working out, for positive comments to team members and for exercise knowledge. Users can achieve various levels both individually and part of team, where the leaderboards can be readily visible across the platform. Moreover, through the platform, various parties can provide sponsorship for programs, for example local establishments offering a pizza party to the best team, a shoe company offering a gift certificate to the winning athlete, or any other suitable reward, the competition and rewards being facilitated across the social platform.

Therefore, the present method and system provides for an improved training system and application. Prior training programs failed to account for medical related information and user personalization accounting for injury prone activities. Prior training programs additionally failed to account for social platform functionality for integrating the various users and fostering not only a better sense of community, but motivating the users through friendly and healthy competition made visible on the social platform. The platform leverages the power of gamification by integrating the mechanics of gaming to change athlete's behavior and promote better health and conditioning. Through the use of these gaming features, the platform empowers proper and injury-reduced training, driving athletic and community participation, building loyalty among users, teammates and third party sponsors, and incentivize athletes and teams to achieve their peak performance.

As described above, the method and system relates to social and gaming networking for teams, including younger athletes such as kids, teenagers, etc. But it is recognized that the system is equally applicable and usable with all age levels of users, including older and younger users. The method and system is also not restricted to a formalized team, such as a high school football team, but can be more general in nature for exercise or generalized fitness. For example, the users may include adults looking to get in shape, and the training can be for a particular event. One such example might be individuals joining a charity road race team for running a charity race, such as a half marathon. The users can interact with each other via the platform, where teams may be determined based on geography, user preference for joining together, fundraising goals, or any other usable metric. Using the method and system, the user is then provided a training program and following that training program is part of the social and gaming interaction.

In general, the method and system provides an electronic means for improving the health and fitness of the user while reducing the propensity or risk for injury. Fitness is improved through regular and structured training, as well as social and game features to maintain motivation for the users to not only continue the training program, but to excel and advance in the user's training abilities. In addition to the social features and medical safeguards in designing the training routines, the system offers the commercial aspect for reward and/or sponsorship opportunities as noted above. Thus, users of the system can attain their physical goals in a helpful, nurturing electronic environment having goals and rewards integrated as part of the gaming experience.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized interactive training method, the method executed on at least one computer processing device in response to executable instructions, the method comprising:
receiving a plurality of user data for a user, the user data including physical user data, medical history data and athletic goal data for the user;
determining a baseline data set for the user based on the user data and medical data, wherein the medical data includes injury prevention data relating to prevention of one or more injuries specific to a designated sport;
electronically generating a training routine for the user for the designated sport based on the baseline data set and the user data, including selecting, from a data set of exercises, a plurality of exercises for the user, the exercises directed towards the athletic goal data, wherein the training routine includes a plurality of exercises selected based on the injury prevention data relating to the designated sport;
electronically determining via the at least one computer processing device, a network of related users electronically networked via a networking interface, where the related users are related based on the athletic goal;
transmitting the training routine to the user and notifying the related users of the training routine via the networking interface;
receiving training feedback data from the user, including exercise-specific information;
electronically sharing via the at least one computer processing device the training feedback data with fellow community users across the networking interface;
receiving video feedback of the user performing the exercise as training feedback data; and
electronically comparing the video feedback of the user relative a visual representation of the exercise;
wherein the networking interface is a social gaming and network platform allowing community users to electronically communicate thereacross.

2. The method of claim 1 further comprising:
receiving physical activity data relating to the user for the performance of a plurality of baseline exercises; and
determining the baseline data set for the user based on the physical activity data.

3. The method of claim 2, wherein the injury prevention data is based on the athletic goal data.

4. The method of claim 1 further comprising:
transmitting a plurality of visual training displays to the user, the visual training displays including visual representations of one or more of the set of exercises.

5. The method of claim 1, wherein transmitting the training routine includes electronically transmitting a daily regiment of the training routine to the user and sharing the training feedback data includes posting the training feedback data on the networking interface.

6. The method of claim 1, wherein the method further comprising:
providing one or more incentives to the community of users based on the communication of training data made electronically available on the social network platform.

7. The method of claim 6, further comprising: modifying the one or more incentives to the community of users based at least on the training feedback data.

8. The method of claim 1 further comprising:
modifying the training routine based on the training feedback data and at least one of the physical user data, medical history data, and athletic goal data for the user;

updating the training routine for the user based on the modification to the training routine; and transmitting the updated training routine to the user.

9. A system for interactive training, the system comprising:
a computer readable medium having executable instructions stored therein; and
a least one computer processing device, in response to the executable instructions, operative to:
receive a plurality of user data for a user, the user data including physical user data, medical history data and athletic goal data for the user and medical data, wherein the medical data includes injury prevention data relating to prevention of one or more injuries specific to a designated sport;
determine a baseline data set for the user based on the user data;
generate a training routine for the user for the designated sport based on the baseline data set and the user data, including selecting, from a data set of exercises, a plurality of exercises for the user, the exercises directed towards the athletic goal data wherein the training routine includes a plurality of exercises selected based on the injury prevention data relating to the designated sport;
determine a network of related users electronically networked via a networking interface, where the related users are related based on the athletic goal;
transmit the training routine to the user and notifying the related users of the training routine via the networking interface;
receive training feedback data from the user, including exercise-specific information;
share the training feedback data with fellow community users across the networking interface;
receive video feedback of the user performing the exercise as training feedback data; and
electronically compare the video feedback of the user relative a visual representation of the exercise;

wherein the networking interface is a social network platform allowing community users to electronically communicate thereacross.

10. The system of claim 9, the processing device, in response to further executable instructions, operative to:
receive physical activity data relating to the user for the performance of a plurality of baseline exercises; and
determine the baseline data set for the user based on the physical activity data.

11. The system of claim 9, wherein the injury prevention data is based on the athletic goal data.

12. The system of claim 9, the processing device, in response to further executable instructions, operative to:
transmit a plurality of visual training displays to the user, the visual training displays including visual representations of one or more of the set of exercises.

13. The system of claim 9, wherein transmitting the training routine includes electronically transmitting a daily regiment of the training routine to the user and sharing the training feedback data includes posting the training feedback data on the networking interface.

14. The system of claim 9, wherein the processing device, in response to further executable instructions, operative to:
provide electronic incentive to the community of users based on the communication of training data made electronically available on the social network platform.

15. The system of claim 14, the processing device further operative to modify the one or more incentives to the community of users based at least on the training feedback data.

16. The system of claim 9, the processing device, in response to further executable instructions, operative to:
modify the training routine based on the training feedback data and at least one of the physical user data, medical history data, and athletic goal data for the user;
update the training routine for the user based on the modification to the training routine; and
transmit the updated training routine to the user.

* * * * *